US012037231B2

(12) United States Patent
Green et al.

(10) Patent No.: US 12,037,231 B2
(45) Date of Patent: Jul. 16, 2024

(54) MODULAR CONFIGURABLE INGROUND AUTOMOTIVE LIFT SYSTEM

(71) Applicants: Steve Green, Lincolnton, NC (US); Giovanni Dallapiccola, Ferrara (IT)

(72) Inventors: Steve Green, Lincolnton, NC (US); Giovanni Dallapiccola, Ferrara (IT)

( * ) Notice: Subject to any disclaimer, the term of this patent is extended or adjusted under 35 U.S.C. 154(b) by 0 days.

(21) Appl. No.: 18/450,824

(22) Filed: Aug. 16, 2023

(65) Prior Publication Data

US 2023/0391591 A1 Dec. 7, 2023

Related U.S. Application Data

(63) Continuation of application No. 17/282,518, filed as application No. PCT/US2019/054414 on Oct. 3, 2019, now Pat. No. 11,731,865.

(60) Provisional application No. 62/740,633, filed on Oct. 3, 2018.

(51) Int. Cl.
*B66F 7/00* (2006.01)
*B66F 7/20* (2006.01)
*B66F 7/28* (2006.01)

(52) U.S. Cl.
CPC . *B66F 7/20* (2013.01); *B66F 7/28* (2013.01)

(58) Field of Classification Search
CPC .................................... B66F 7/00; B66F 7/28
See application file for complete search history.

(56) References Cited

U.S. PATENT DOCUMENTS 4,201,053 A * 5/1980 Atkey ..................... F15B 15/16 60/486
5,060,762 A * 10/1991 White ....................... B66B 1/24 187/285
11,731,865 B2 * 8/2023 Green ....................... B66F 7/28 254/89 H
2007/0119658 A1 * 5/2007 Nussbaum ................ B66F 7/28 187/215

(Continued)

*Primary Examiner* — Lee D Wilson
(74) *Attorney, Agent, or Firm* — Sisson & Banyas, Attorneys at Law, LLC; Jeffrey J. Banyas

(57) ABSTRACT

A modular configurable automotive lift (10) comprising: at least two automotive lift modules (100) wherein each automotive lift module comprises: an outer longitudinal post (110) having a hollow interior, an outer longitudinal post first end (111), and an outer longitudinal post second end (112) opposite the outer longitudinal post first end; an inner longitudinal post (120) at least partially nested within the hollow interior of the outer longitudinal post the inner longitudinal post having an inner longitudinal post first end (121) and an inner longitudinal post second end (122) opposite the inner longitudinal post first end; a first bearing (115) connected to an inner longitudinal surface of the outer longitudinal post; a second bearing (125) connected to an outer longitudinal surface of the inner longitudinal post; an actuator (500) configured to advance the outer longitudinal post first end away from the inner longitudinal post first end or configured to advance the inner longitudinal post first end away from the outer longitudinal post first end; and a superstructure (200) connected to the inner longitudinal post first end or to the outer longitudinal post first end by a mounting flange (130), the superstructure comprising at least one vehicle engagement arm (210) extending from the superstructure.

14 Claims, 11 Drawing Sheets

(56) References Cited

U.S. PATENT DOCUMENTS

| | | | | |
|---|---|---|---|---|
| 2008/0069676 | A1* | 3/2008 | Kozak | B66F 7/28 414/672 |
| 2021/0309499 | A1* | 10/2021 | Elliott | B66F 7/28 |
| 2021/0387838 | A1* | 12/2021 | Green | B66F 7/28 |
| 2023/0011902 | A1* | 1/2023 | Denzik | B66F 3/38 |
| 2023/0391591 | A1* | 12/2023 | Green | B66F 7/16 |

* cited by examiner

MODULAR CONFIGURABLE INGROUND AUTOMOTIVE LIFT SYSTEM

CROSS REFERENCES AND PRIORITIES

This application claims priority from United States Provisional Application No. 62/740,633 filed on 3 Oct. 2018 the teachings of which are incorporated by reference herein in their entirety.

FIELD OF THE INVENTION

The present invention relates to the field of inground automotive lifts. In particular, the present invention is directed toward a lift system utilizing a base unit that may be installed more easily, used in multiple configurations for both new installations and retrofit into existing competitive lifts, and having a lift column that is supported along its full length of movement.

BACKGROUND OF THE INVENTION

Modern high pressure two-post inground lifts are known in the art to have a large housing that is buried below floor level. This housing contains the lifting columns, hydraulic lines, high-pressure cylinders, and rigid cross-beam that connects the columns. The column design known in the art utilizes a round section made from pipe, which contains the high-pressure hydraulic cylinder, and is restrained by a pair of bearings, usually spaced approximately 20 inches apart. The bearings are usually made from a plastic material, UHMW polyethylene for example.

The large housing requires a deep trench, typically 9 feet deep by 3 feet wide by 8 feet long, be buried before placing the lift which may require excavation equipment and specific safety measures be taken during installation.

Current housing configurations do not allow for adjustment of the column spacing at installation, which is desired by some car manufacturers to avoid having to drive over the ends of the columns and superstructures with the vehicle tires. The fixed-width housings and rigid cross-beam also do not allow for installation or retrofit into other brands of competitive lift frames.

The column bearings require some amount of clearance between the bearings and the column to allow sliding movement between them. This clearance allows the column to exhibit undesired front to back movement when a vehicle is placed on the lift. This movement is amplified as the mass of the vehicle bounces back and forth. Current bearing support designs, with short distances between their bearings, do not adequately limit vehicle movement.

Therefore, a solution that allows for greater installation flexibility, with decreased installation effort and cost, and better vehicle stability during use is needed in the field.

BRIEF SUMMARY OF THE INVENTION

A modular configurable automotive lift is disclosed. The modular configurable automotive lift may comprise at least two automotive lift modules. Each automotive lift module may comprise an outer longitudinal post, an inner longitudinal post, a first bearing, a second bearing, an actuator, and a superstructure.

The outer longitudinal post may have a hollow interior, an outer longitudinal post first end, and an outer longitudinal post second end opposite the outer longitudinal post first end. The inner longitudinal post may be at least partially nested within the hollow interior of the outer longitudinal post. The inner longitudinal post may have an inner longitudinal post first end and an inner longitudinal post second end opposite the inner longitudinal post first end.

The first bearing may be connected to an inner longitudinal surface of the outer longitudinal post. The second bearing may be connected to an outer longitudinal surface of the inner longitudinal post.

The actuator may be configured to advance the outer longitudinal post first end away from the inner longitudinal post first end. Alternatively, the actuator may be configured to advance the inner longitudinal post first end away from the outer longitudinal post first end.

The superstructure may be connected to the inner longitudinal post first end or to the outer longitudinal post first end by a mounting flange. The superstructure may comprise at least one vehicle engagement arm extending from the superstructure.

In some embodiments the actuator may be selected from the group consisting of a single hydraulic cylinder, a single pneumatic cylinder, and a single electric actuator. The actuator may further comprise a position sensor.

In alternative embodiments, the actuator may be a dual redundant hydraulic cylinder. In some such embodiments, the dual redundant hydraulic cylinder may be connected between the outer longitudinal post at the outer longitudinal post second end and the inner longitudinal post at the inner longitudinal post first end. In such embodiments, the dual redundant hydraulic cylinder may be configured to advance the inner longitudinal post first end away from the outer longitudinal post first end. In other embodiments the dual redundant hydraulic cylinder may be connected between the inner longitudinal post at the inner longitudinal post second end and the outer longitudinal post at the outer longitudinal post first end. In such embodiments, the dual redundant hydraulic cylinder may be configured to advance the outer longitudinal post first end away from the inner longitudinal post first end.

In some embodiments the first bearing may be connected to the inner longitudinal surface of the outer longitudinal post at the outer longitudinal post first end. In some such embodiments, the second bearing may be connected to the outer longitudinal surface of the inner longitudinal post at the inner longitudinal post second end.

At least one of the first bearing and the second bearing may comprise a material selected from the group consisting of an extruded ultra high molecular weight polyethylene (UHMW) material, bronze, powdered metal, and Teflon®.

In some embodiments the first bearing may comprise more than one first bearing. In some such embodiments each of the first bearings may be connected to a separate point on the inner longitudinal surface of the outer longitudinal post. In some such embodiments, the more than one first bearings may be connected to the inner longitudinal surface of the outer longitudinal post at the outer longitudinal post first end in series with each other.

In some embodiments the second bearing may comprise more than one second bearing. In some such embodiments each of the second bearings may be connected to a separate point on the outer longitudinal surface of the inner longitudinal post. In some such embodiments the more than one second bearings may be connected to the outer longitudinal surface of the inner longitudinal post at the inner longitudinal post second end in series with each other.

In some embodiments a first distance between the first bearing and the second bearing when the automotive lift modules are in a fully retracted position may be in a range of between 50 inches and 100 inches. In some embodiments, a second distance between the first bearing and the second bearing when the automotive lift modules are in a fully extended position is in a range of between 10 inches and 30 inches.

In some embodiments, the superstructure may comprise at least two vehicle engagement arms extending from the superstructure. In some embodiments the vehicle engagement arm is pivotable about an axis which is parallel to a length dimension of the outer longitudinal post and/or the inner longitudinal post. In some embodiments the vehicle engagement arm is extendable.

In alternative embodiments the superstructure may comprise a frame engaging pad connected to the superstructure. Alternatively, the superstructure may comprise a runway connected to the superstructure.

In some embodiments the outer post is sealed at the outer longitudinal post second end. In some embodiments at least one of the automotive lift modules does not comprise a secondary environmental isolation structure.

In some embodiments, at least one of the automotive lift modules further comprises a secondary safety mechanical lock system.

A method for equalizing the position of two or more automotive lift modules of the type disclosed herein is also disclosed. The method may comprise the steps of: a) extending a first automotive lift module and at least a second automotive lift module to an extended position, b) sensing the extended position of the first automotive lift module relative to the extended position of at least the second automotive lift module using a position sensor, c) determining if the extended position of the first automotive lift module is equal to or different from the extended position of at least the second automotive lift module, and d) providing a feedback signal to the actuator of the first automotive lift module and/or the actuator of the second automotive lift module when the extended position of the first automotive lift module is different from the extended position of at least the second automotive lift module, wherein the feedback signal causes the actuator of the first automotive lift module and/or the actuator of the second automotive lift module to extend and/or retract until the extended position of the first automotive lift module is equal to the extended position of at least the second automotive lift module.

DETAILED DESCRIPTION

Disclosed herein is a modular configurable automotive lift. The modular configurable automotive lift is described below with reference to the Figures. As described herein and in the claims, the following numbers refer to the following structures as noted in the Figures.

1A refers to an excavation profile known in the art.
1B refers to a system excavation profile.
5 refers to a prior art inground lift.
10 refers a modular configurable automotive lift.
50 refers to a prior art superstructure.
51 refers to prior art engagement arms.
52 refers to a prior art column.
53 refers to a prior art mounting flange.
54 refers to a prior art containment unit and frame.
55 refers to prior art bearing locations.
100 refers to an automotive lift module, also known as a column module.
110 refers to an outer longitudinal post, also known as a housing.
111 refers to an outer longitudinal post first end.
112 refers to an outer longitudinal post second end.
115 refers to first bearing(s), also known as upper bearings.
120 refers to an inner longitudinal post, also known as a column.
121 refers to an inner longitudinal post first end.
122 refers to an inner longitudinal post second end.
125 refers to second bearing(s), also known as lower bearings.
130 refers to a mounting flange.
140 refers to an attachment device.
200 refers to a superstructure.
210 refers to a pivotable vehicle engagement arm, also known as vehicle
engagement arms.
220 refers to a vehicle engagement pad.
300 refers to a hydraulic and electrical connector.
400 refers to a module installation frame.
500 refers to an actuator.
510 refers to a dual redundant hydraulic cylinder.

Figure 1:
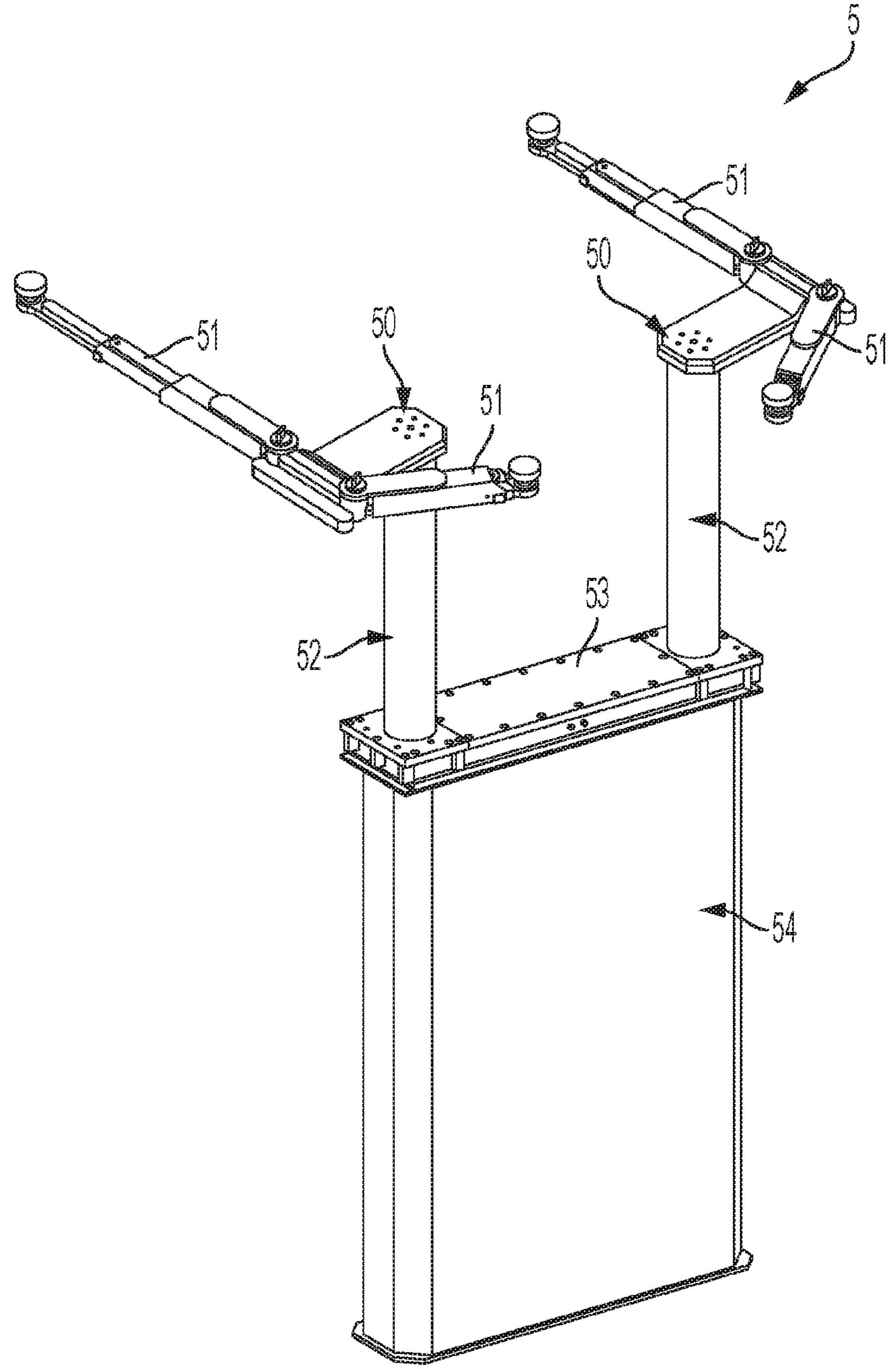
FIG. 1 PRIOR ART
FIG. 1 shows a perspective view of a prior art inground lift.

FIG. 1 is a perspective view of a prior art inground lift (10). The prior art inground lift consists of prior art vehicle engagement arms (51) which contact the vehicle, and prior art superstructure (50) which connects the prior art vehicle engagement arms to the prior art column (52). The prior art columns reside in a prior art containment unit and frame (54) and the prior art mounting flange (53) guides the prior art column throughout its movement.

High pressure lifts are so named due to the use of a smaller diameter hydraulic cylinder used within the prior art column (52) to accomplish the lifting instead of using low hydraulic pressure acting against the prior art column itself to lift.

Figure 2:
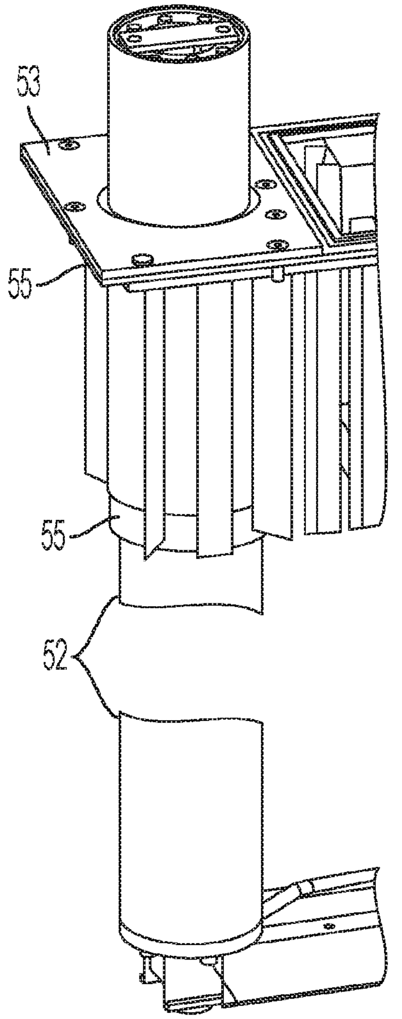
FIG. 2 PRIOR ART
FIG. 2 shows a perspective view of a prior art inground lift bearing configuration

FIG. 2 is a perspective view of the internal components of the prior art inground lift shown in FIG. 1 with the prior art containment unit and frame (54) removed for clarity. Shown in this view is the prior art mounting flange (53) and the approximate prior art bearing locations (55) inside of the prior art mounting flange where the bearings reside in the prior art inground lift. Again, the bearings guide the prior art column throughout its travel up and down. The approximate spacing between the two bearings known in the art is 20 inches.

Figure 3:
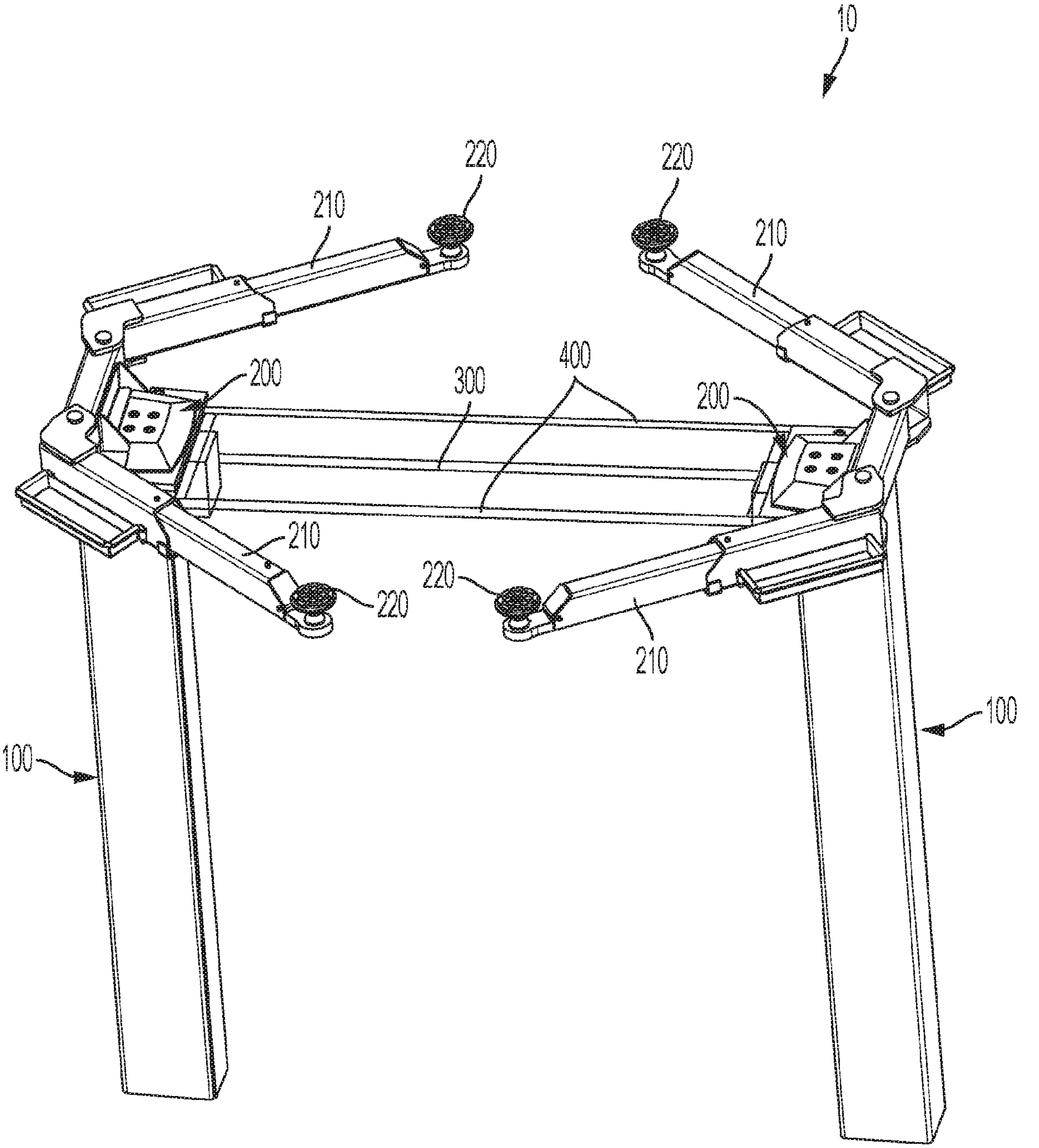
FIG. 3 shows a perspective view of an embodiment of the invented automotive lift.

FIG. 3 is a perspective view of an example of the present invention modular configurable automotive lift (10) installed at a wide setting utilizing the variable spacing of the automotive lift modules (100). This setting allows for vehicles to be pushed easily onto the lift if they are without power. The hydraulic and electrical connector (300) and the module installation frame (400) are shown and both only need a shallow excavation between the modules.

As shown in FIG. 3, the modular configurable automotive lift (10) may include one or more automotive lift modules (100) with each automotive lift module being connected to a superstructure (200) which comprises at least one vehicle engagement arm (210). Each vehicle engagement arm may further be connected to a vehicle engagement pad (220) as described herein.

As shown in FIG. 3 the superstructure (200) may comprise at least one vehicle engagement arm (210) extending therefrom. Preferably each superstructure will comprise at least two vehicle engagement arms extending therefrom in order to provide better stability to the vehicle while it is lifted off the ground.

In some embodiments at least one—and preferably all—of the vehicle engagement arm(s) (210) are pivotable. The pivot point for the vehicle engagement arm(s) is the point at which the vehicle engagement arm connects to the superstructure (200). This point may include a fastener, and optionally a friction reducing mechanism such as a bearing or bushing. It is preferred that the vehicle engagement arm(s) be pivotable about an axis which is substantially parallel to or parallel to a length dimension of the outer longitudinal post and/or the inner longitudinal post in order to maintain the vehicle in a level position as it is lifted off the ground.

In some embodiments at least one—and preferably all—of the vehicle engagement arm(s) (210) are extendable. This may be achieved by providing a telescoping vehicle engagement arm.

The vehicle engagement arms (210) may also comprise one or more vehicle engagement pads (220). These vehicle engagement pads connect to the vehicle engagement arms at the end of the vehicle engagement arm opposite the connection to the superstructure (200). The vehicle engagement pads may be made of a material such as rubber which reduces or eliminates the likelihood that the vehicle will shift or skid off of the vehicle engagement arms when the vehicle is being lifted or being worked upon in a lifted position.

Instead of vehicle engagement arms, the superstructure may comprise one or more frame engaging pads connected thereto. Frame engaging pads are commonly known in the art and comprise a sizeable flat plate which engages the frame of the vehicle in order to lift the vehicle. In other embodiments the superstructure may comprise one or more runways which are also known in the art. While runways may be used with modular configurable automotive lifts comprising a single automotive lift module or two automotive lift modules, runways are preferably used in conjunction with a modular configurable automotive lift comprising four separate automotive lift modules. The runways may comprise two separate flat plates running parallel to one another with each runway connected between two opposing automotive lift modules. The vehicle may then drive onto the runway with the vehicle tires engaging with the runway as the vehicle is lifted.

Figure 4:
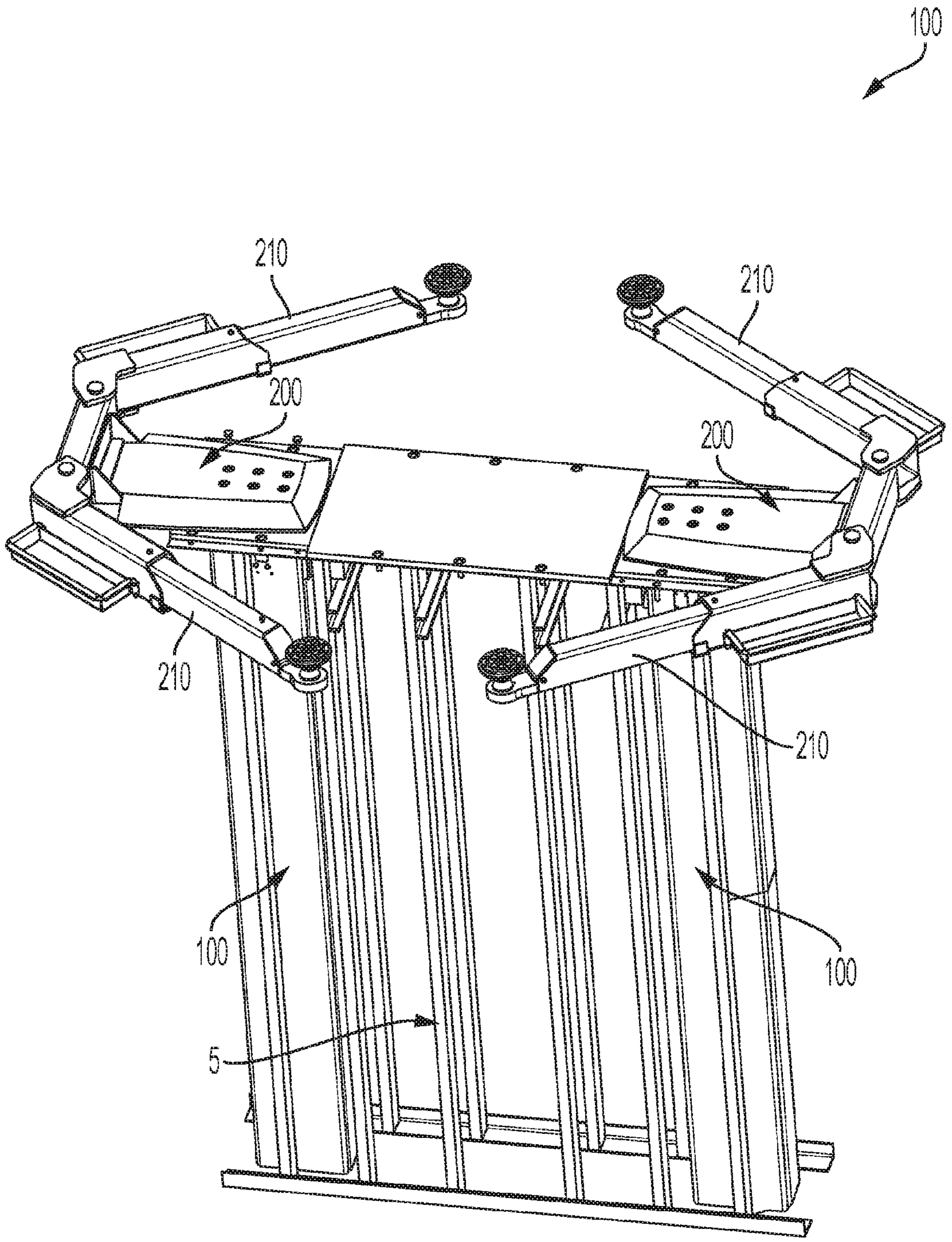
FIG. 4 shows a perspective view of an embodiment of an invented automotive lift retrofitted to a prior art containment unit and frame.

FIG. 4 is a perspective view of a retrofit of an embodiment of the automotive lift modules (100) into a prior art containment unit and frame (54). The outer skin of the prior art containment unit and frame has been removed for clarity.

In some embodiments, the system may have automotive lift modules (100) with mounting flanges (130) designed to interface with competitive lift bolt patterns to allow direct bolt-in retrofit into the existing frame. The mounting flanges are preferably connected one of the outer longitudinal post or the inner longitudinal post perpendicular to the respective longitudinal axis of said outer or inner longitudinal post.

The post that the mounting flanges are connected to will depend upon the configuration of the actuator relative to the outer and inner longitudinal posts. For instance, when the actuator is connected between the outer longitudinal post at the outer longitudinal post second end and the inner longitudinal post at the inner longitudinal post first end such that the actuator advances the inner longitudinal post first end away from the outer longitudinal post first end, the mounting flanges will be connected to the outer longitudinal post at the outer longitudinal post first end. Alternatively, when the actuator is connected between the inner longitudinal post at the inner longitudinal post second end and the outer longitudinal post at the outer longitudinal post first end such that the actuator advances the outer longitudinal post first end away from the inner longitudinal post first end, the mounting flanges will be connected to the inner longitudinal post at the inner longitudinal post first end.

By "competitive lift bolt patterns" it is meant the bolt pattern within the prior art containment unit and frame (54 as shown in FIG. 1) that allows the prior art containment unit and frame to connect to the posts. In other words, the mounting flanges will contain a plurality of mounting flange holes with at least one mounting flange hole—and preferably each of the mounting flange holes—being aligned with a corresponding mounting hole within the prior art containment unit and frame. When the prior art containment unit and frame is mounted to the mounting flanges, a fastener such as a bolt or a bolt with a nut passes through the mounting flange hole and the mounting hole to securely connect the prior art containment unit and frame to the mounting flange.

Figure 5:
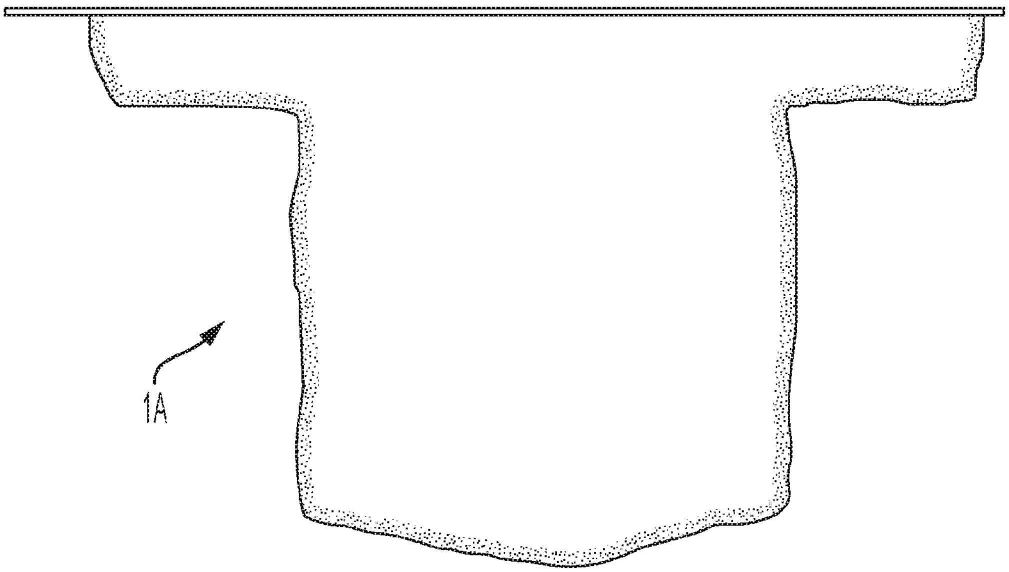
FIG. 5 PRIOR ART
FIG. 5 shows an excavation profile for a prior art inground lift.
Figure 6:
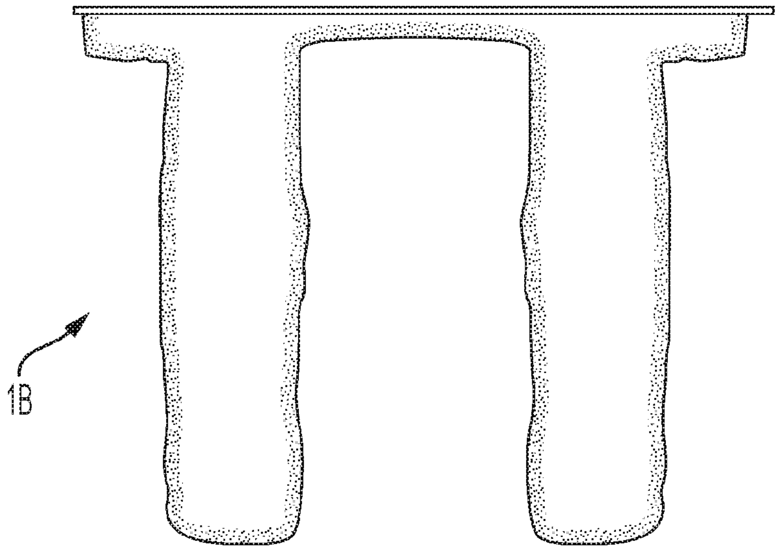
FIG. 6 shows an excavation profile for an embodiment of an invented automotive lift.

FIGS. 5 and 6 detail the differences between the excavation profile known in the art (1A), and a system excavation profile (1B) for the present invention. The excavation profiles may also be referred to as trenches. Trenches known in the art today are typically 9 feet deep by 3 feet wide by 8 feet long.

The preferred embodiment portrayed by the system excavation profile (1B) may comprise two round holes of approximately 2.5 feet in diameter, preferably drilled by an auger. A shallow trench may be placed between them to allow the hydraulic and electric connector (300) to run between them as well as the module installation frame (400).

The automotive lift modules may be provided without the need for a secondary environmental isolation structure—such as the prior art containment unit and frame (54). In other words—embodiments may exist in which at least one of the automotive lift modules does not comprise a secondary environmental isolation structure. In such embodiments, it is preferred that one or both of the outer longitudinal post and/or the inner longitudinal post server the dual purpose of an environmental isolation structure. To do so, the outer post and/or the inner post may be sealed at the respective outer longitudinal post second end and/or inner longitudinal post second end. By sealing the respective second end(s), any environmental contaminants—such as hydraulic fluid—which may be discharged from the actuator (500) will be contained within the outer longitudinal post and/or the inner longitudinal post without the need for a secondary environmental isolation structure.

In preferred embodiments—the outer longitudinal post and/or the inner longitudinal post may comprise a surface treatment to further prevent rust and corrosion. Examples of such surface treatments include galvanizing and coatings such as polyurethane coatings.

Figure 7:
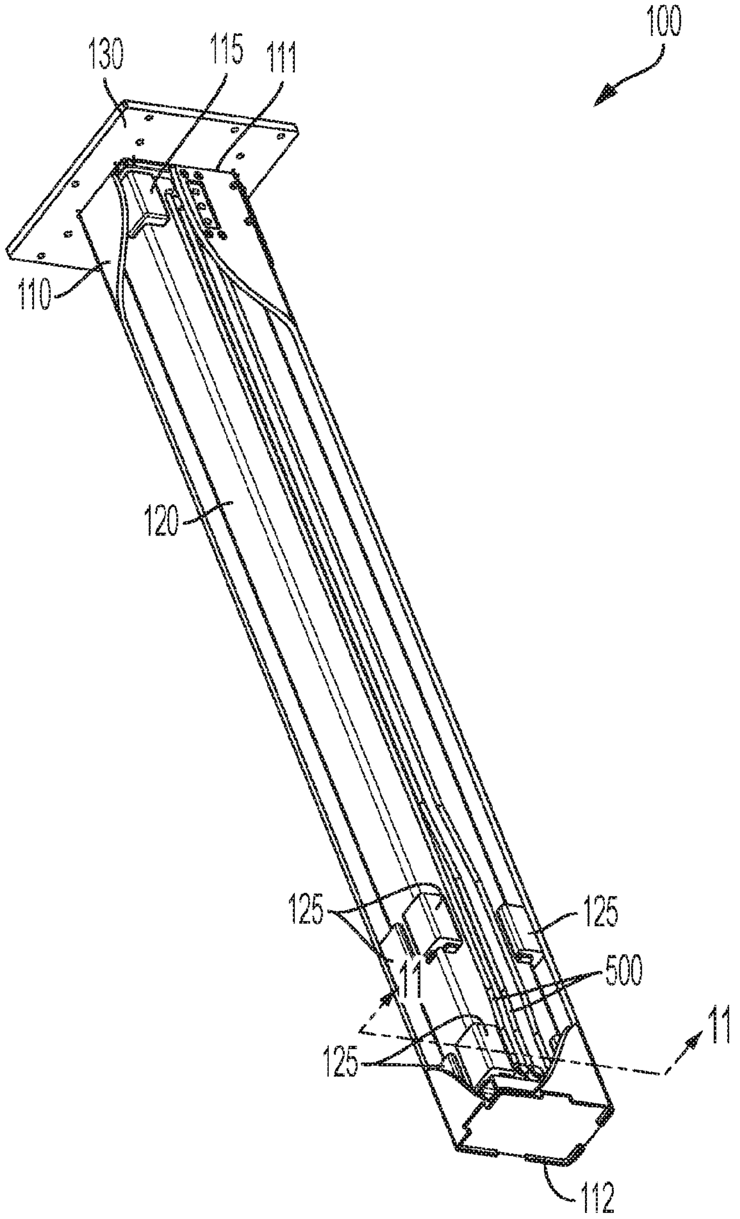
FIG. 7 shows a perspective cut-away view of an embodiment of an automotive lift module for an embodiment of an invented automotive lift in a retracted position.
Figure 8:
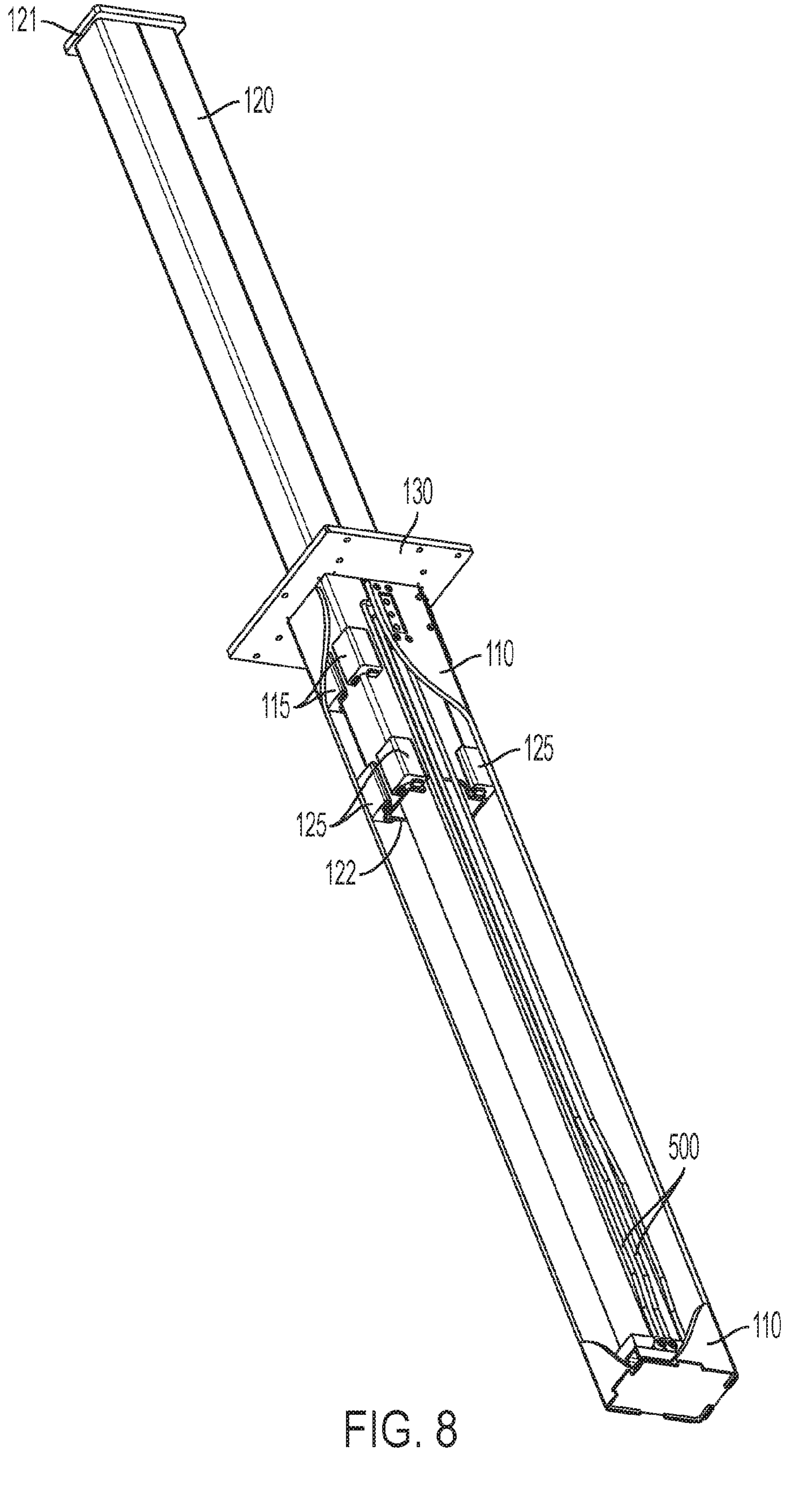
FIG. 8 shows a perspective cut-away view of an embodiment of an automotive lift module for an embodiment of an invented automotive lift in an extended position.
Figure 9:
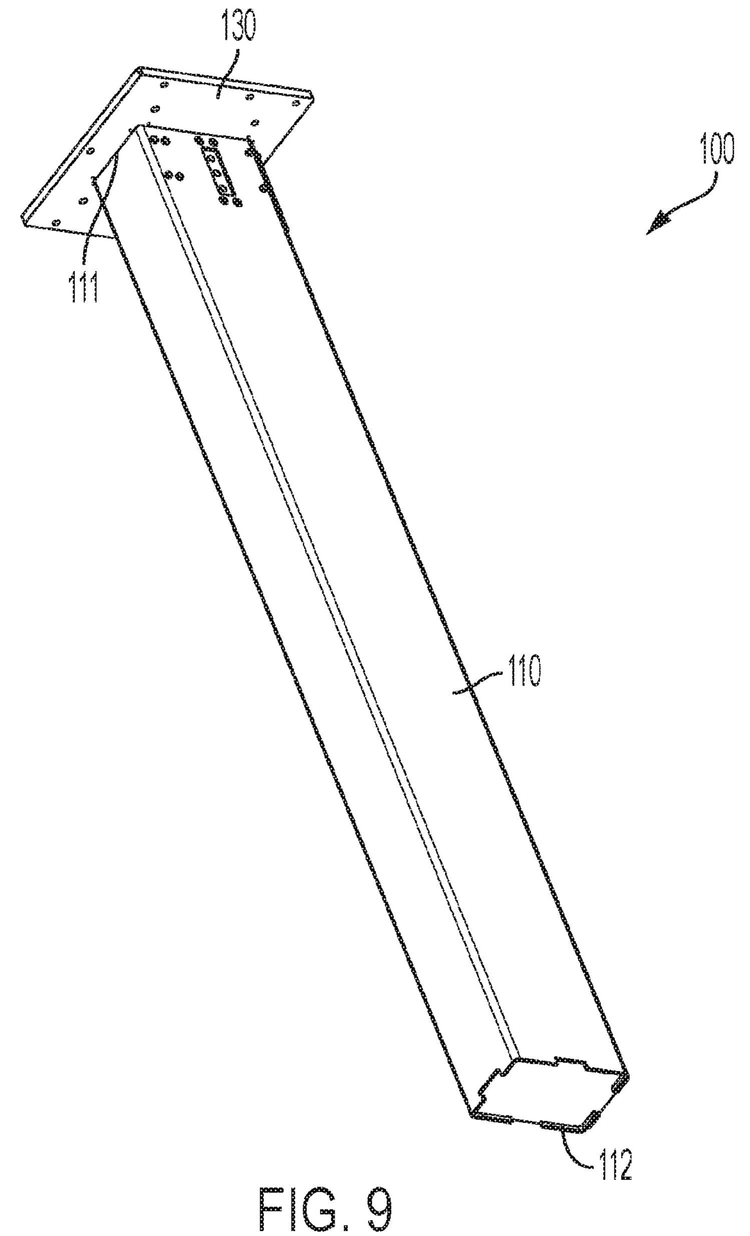
FIG. 9 shows a perspective view of the embodiment of an automotive lift module of FIG. 7.
Figure 10:
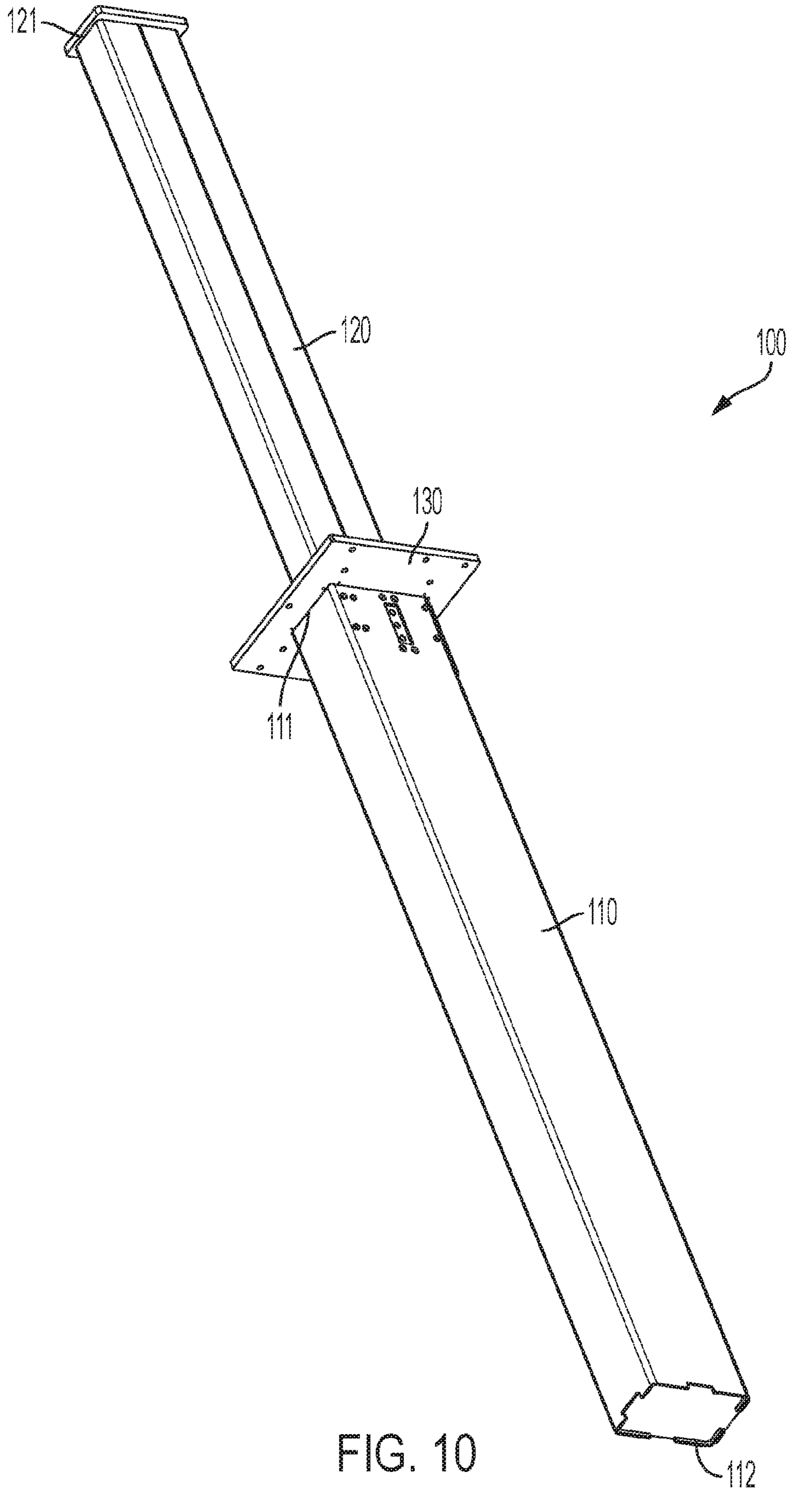
FIG. 10 shows a perspective view of the embodiment of an automotive lift module of FIG. 8.

FIGS. 7 through 10 are perspective views of an exemplary embodiment of a full length bearing arrangement for an automotive lift module (100). The system is shown retracted in FIG. 7 and extended partially in FIG. 8 with each of FIG. 7 and FIG. 8 having a portion of the outer longitudinal post (110) cut-away to show the internal structures of the automotive lift module. FIG. 9 and FIG. 10 show embodiments of FIG. 7 and FIG. 8 respectively with the outer longitudinal post shown in full (i.e.—not cut-away as in FIG. 7 and FIG. 8). Shown in the figures is the unique feature of the system where the first bearing (115) and the second bearing (125) are positioned at a wide spacing of approximately 80 inches when the inner longitudinal post (120) is retracted as shown in FIG. 7. The first bearing and second bearing respectively stabilize the inner and outer longitudinal post as the automotive lift modules extend and retract, and also provide a friction reducing surface during the extension and retraction process. In this respect, while the term "bearing" is used herein, the bearing may also be characterized as a slide block or bushing. Accordingly, the terms "first slide block" or "first bushing" may be used interchangeably with "first bearing" while the terms "second slide block" or "second bushing" may be used interchangeably with "second bearing".

Embodiments exist in which the automotive lift modules (100) are configured such that, when a force is applied by a device—such as an actuator (500)—in a direction parallel to the longitudinal axis of the posts, the inner longitudinal post (120) advances upwards away from the outer longitudinal post (110) to lift the automobile while the outer longitudinal post remains substantially stationary, preferably absolutely stationary. In such embodiments, the actuator may be connected between the outer longitudinal post at the outer longitudinal post second end and the inner longitudinal post at the inner longitudinal post first end. The actuator may then be configured to apply a force parallel to the longitudinal axis of the posts to advance the inner longitudinal post first end away from the outer longitudinal post first end.

Alternative embodiments exist in which the automotive lift modules (100) are configured such that, when a force is applied by a device—such as an actuator (500)—in a direction parallel to the longitudinal axis of the posts, the outer longitudinal post (110) advances upwards away from the inner longitudinal post (120) to lift the automobile while the inner longitudinal post remains substantially stationary. In such embodiments, the actuator may be connected between the inner longitudinal post at the inner longitudinal post second end and the outer longitudinal post at the outer longitudinal post first end. The actuator may then be configured to apply a force parallel to the longitudinal axis of the posts to advance the outer longitudinal post first end away from the inner longitudinal post first end.

The actuators (500) may be any type of actuator known in the art. Examples of types of actuators include a hydraulic actuator, a pneumatic actuator, an electric actuator, a magnetic actuator, and a mechanical actuator. While it is preferred that each individual automotive lift module in the modular configurable automotive lift comprises the same type of actuator, embodiments may exist where different types of actuators are used in each individual automotive lift module.

Figure 11:
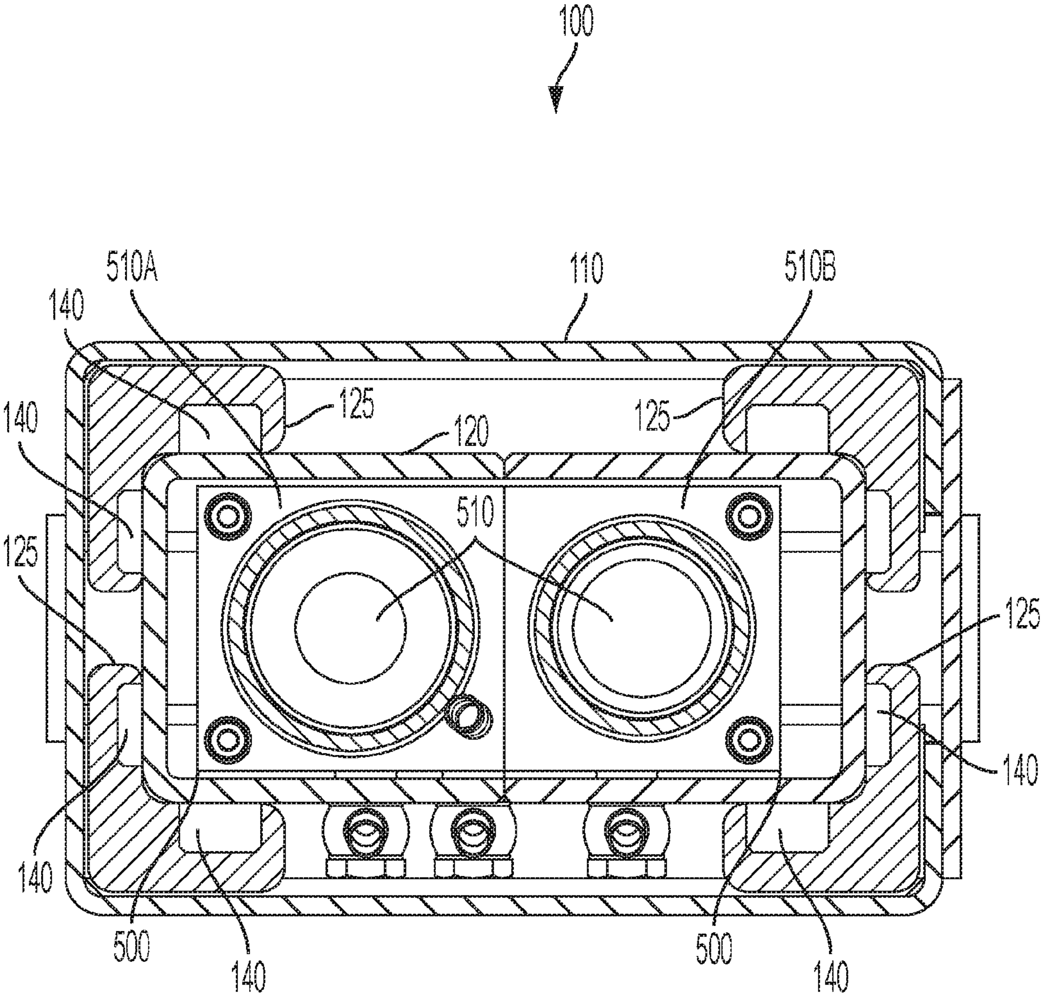
FIG. 11 shows a cross-section view of an embodiment of an automotive lift module for an embodiment of an invented automotive lift.

One preferred actuator is a dual redundant hydraulic cylinder (510). The dual redundant hydraulic cylinder may have a first hydraulic cylinder system (510A as shown in FIG. 11) and a second hydraulic cylinder system (510B as shown in FIG. 11). In some embodiments, the first hydraulic cylinder system and the second hydraulic cylinder system may be arranged in a side by side configuration as shown in FIG. 11. In other embodiments, the first hydraulic cylinder system may be arranged radially around the second hydraulic cylinder system. The first and second hydraulic cylinder systems may operate off of a common piston, or each hydraulic cylinder system may have its own individual piston. Each hydraulic cylinder system will have its own work area defined as the volume of a cylinder chamber within which the piston operates. In some embodiments, the first hydraulic cylinder system may have a work area which is substantially equal to or equal to the second hydraulic cylinder system's work area. In other embodiments, the first hydraulic cylinder system may have a work area which is less than or greater than the second hydraulic cylinder system's work area.

The first hydraulic cylinder system and the second hydraulic cylinder system may be configured in a master/slave arrangement in which hydraulic fluid from one end of the master hydraulic cylinder is advanced into one end of the slave hydraulic cylinder. This allows for equalization of the pressure applied by the actuator (in this case the dual redundant cylinder) as the automotive lift module advances and retracts.

The dual redundant hydraulic cylinder (510) provides a non-mechanical means for equalizing the position of two or more automotive lift modules (100). Other non-mechanical means for equalizing the position of two or more automotive lift modules may exist. For example, the actuator may comprise a single hydraulic cylinder, a single pneumatic cylinder, or a single electric actuator—any of which may be equipped with a position sensor which provides feedback between the actuators of the individual automotive lift modules to raise or lower one or more of the individual automotive lift modules in order to equalize the position of each of the automotive lift modules.

In this regard, the method for equalizing the position of two or more automotive lift modules may comprise several steps. In a first step, a first automotive lift module and at least a second automotive lift module may be extended to an extended position by their respective actuator.

Once extended, the position sensor of each of the first automotive lift module and at least the second automotive lift module may sense the extended position of the first automotive lift module relative to the extended position of the second automotive lift module. This can then determine if the extended position of the first automotive lift module is equal to or different from the extended position of at least the second automotive lift module. In other words—is the first automotive lift module extended to the same length as at least the second automotive lift module.

If the extended position of the first automotive lift module is different from the extended position of at least the second automotive lift module, the sensor may provide a feedback signal to the actuator of the first automotive lift module and/or the second automotive lift module. The feedback signal may then cause the actuator of the first automotive lift module and/or the actuator of the second automotive lift module to extend and/or retract until the extended position of the first automotive lift module is equal to the extended position of at least the second automotive lift module.

While the method has been described with reference to a modular configurable automotive lift comprising two automotive lift modules—the same method may be used for modular configurable automotive lifts comprising more than two automotive lift modules.

FIG. 11 shows a cross-section of an automotive lift module (100) taken from at or near the outer longitudinal post second end (112) as indicated in FIG. 7. As shown in FIG. 11, the actuator (500), which in this case is a dual redundant hydraulic cylinder (510) comprised of a first hydraulic cylinder system (510A) and a second hydraulic cylinder system (510B), is disposed within the hollow interior of the inner longitudinal post (120). FIG. 11 also shows the second bearing(s) (125) attached to the corners of the outer surface of the inner longitudinal post at the inner longitudinal post second end by a plurality of attachment devices (140). The plurality of attachment devices may be of any type disclosed herein included tabs and threaded fasteners. The inner longitudinal post is at least partially nested within the hollow interior of the outer longitudinal post (110) with the outer longitudinal post disposed over and around the inner longitudinal post and the second bearings.

In some embodiments, the system may comprise one or more second bearing(s) (125) which may be attached to the inner longitudinal post (120), that travels up and down within the outer longitudinal post (110). In some embodiments, the second bearing(s) may be attached to the inner longitudinal post via a tab/tabs extending from the second bearing(s) which connects to a hole within the inner longitudinal post. In alternative embodiments, any other attachment device or method may be used. One alternative attachment device is a threaded fastener/threaded fasteners such as a bolt (with or without a nut) or a screw. In preferred embodiments, a second bearing may be comprised of an extruded ultra high molecular weight polyethylene (UHMW) plastic. In other embodiments, any other type of bearing may be used. Examples of other types of bearing material include bronze, powdered metal, and Teflon®.

In some embodiments, the first bearing(s) (115) may be attached to the outer longitudinal post (110) and may remain stationary. In some embodiments, the first bearing(s) may be attached to the outer longitudinal post via threaded fasteners. In alternative embodiments, any other attachment device or method may be used. One alternative attachment device is a tab/tabs extending from the first bearing(s) which connects to a hole within the outer longitudinal post. In preferred embodiments, the first bearing(s) may be comprised of an extruded ultra high molecular weight polyethylene (UHMW) plastic. In other embodiments, any other type of bearing may be used. Examples of other types of bearing material include bronze, powdered metal, and Teflon®.

In some embodiments there may be more than one first bearing (115) connected to the inner longitudinal surface of the outer longitudinal post (110). For instance, in some embodiments there may be four first bearings with each first bearing connected to a different corner of the inner longitudinal surface of the outer longitudinal post. In some embodiments, there may be two or more first bearings arranged in series with one another along the length of a corner of the inner longitudinal surface of the outer longitudinal post. The two or more first bearings arranged in series with one another along the length may be on any combination of corners of the inner longitudinal surface of the outer longitudinal post including one of the corners, two of the corners, three of the corners, and four of the corners. Each of the first bearings may individually be connected to the inner longitudinal surface of the outer longitudinal post by any of the attachment mechanisms disclosed herein including a tab/tabs extending from the first bearing(s) which connects to a hole within the outer longitudinal post and/or a threaded fastener/threaded fasteners such as a bolt (with or without a nut) or a screw. Materials for the first bearing(s) may include an extruded ultra high molecular weight polyethylene (UHMW) plastic or any other type of bearing material. Examples of other types of bearing material include bronze, powdered metal, and Teflon®.

Similarly, there may be more than one second bearing (125) connected to the outer longitudinal surface of the inner longitudinal post (120). For instance, in some embodiments there may be four second bearings with each second bearing connected to a different corner of the outer longitudinal surface of the inner longitudinal post. In some embodiments, there may be two or more second bearings arranged in series with one another along the length of a corner of the outer longitudinal surface of the inner longitudinal post as shown in FIG. 7. The two or more second bearings arranged in series with one another along the length may be on any combination of corners of the outer longitudinal surface of the inner longitudinal post including one of the corners, two of the corners, three of the corners, and four of the corners. Each of the second bearings may individually be connected to the outer longitudinal surface of the inner longitudinal post by any of the attachment mechanisms disclosed herein including a tab/tabs extending from the first bearing(s) which connects to a hole within the inner longitudinal post and/or a threaded fastener/threaded fasteners such as a bolt (with or without a nut) or a screw. Materials for the second bearing(s) may include an extruded ultra high molecular weight polyethylene (UHMW) plastic or any other type of bearing material. Examples of other types of bearing material include bronze, powdered metal, and Teflon®.

In some embodiments, the system may comprise a bearing span (distance between a first bearing (115) and a second bearing 125)) that starts at approximately 80 inches with the lift lowered (with the inner longitudinal post (120) fully retracted or lowered into the outer longitudinal post (110) as shown in FIG. 7 and FIG. 9), and decreases as the lift is raised (with the inner longitudinal post fully extended or raised out of the outer longitudinal post as shown in FIG. 8 and FIG. 10) to approximately 20 inches. In other embodiments, the system may comprise a larger or smaller bearing span preferably based on the size and weight capacity of the system.

The bearing span when the automotive lift modules are in a fully retracted position may also be described as a first distance between the first bearing and the second bearing. The first distance may be in a range selected from the group consisting of between 50 inches and 100 inches, between 50 inches and 90 inches, between 50 inches and 80 inches, between 50 inches and 70 inches, and between 50 inches and 60 inches. Similarly, the bearing span when the automotive lift modules are in a fully extended position may be described as a second distance between the first bearing and the second bearing. This second distance may be in a range selected from the group consisting of between 10 inches and 30 inches, between 10 inches and 25 inches, between 10 inches and 20 inches, and between 10 inches and 15 inches.

As used herein and in the claims, the term “bearing span” refers to the greatest distance between a first bearing (115) and a second bearing (125) measured from the longitudinal center point of the respective bearing which is the midpoint measured along the longitudinal direction of the respective post. For example, in embodiments having a single first bearing and a single second bearing, the "bearing span" refers to the distance between the single first bearing and the single second bearing. In embodiments having a single first bearing and two second bearings arranged in series with one another, the "bearing span" refers to the distance between the single first bearing and the second bearing which is closest to the second end of the inner longitudinal post. As another example, in embodiments having two first bearings arranged in series with one another and two second bearings arranged in series with one another, the "bearing span" refers to the distance between the first bearing which is closest to the first end of the outer longitudinal post and the second bearing which is closest to the second end of the inner longitudinal post.

In some embodiments, the outer longitudinal post (110) may be attached to the mounting flange (130), which connects to the containment unit and frame (not shown) that is typically buried or submerged below a floor surface. In some embodiments, the outer longitudinal post may be attached to the mounting flange via welding. In alternative embodiments, any other attachment device or method may be used such as threaded fasteners or manufacturing the outer longitudinal post and the mounting flange of a single integral piece of material.

In some embodiments, the inner longitudinal post (120) is attached to the mounting flange (130), which connects the containment unit and frame (not shown) that is typically buried or submerged below a floor surface. In some embodiments, the inner longitudinal post may be attached to the mounting flange via welding. In alternative embodiments, any other attachment device or method may be used such as threaded fasteners or manufacturing the inner longitudinal post and the mounting flange of a single integral piece of material.

In some embodiments, inner longitudinal post (120) and outer longitudinal post (110) may both be produced using sheetmetal forming and welding instead of machined and welded pipe. This offers advantages with respect to required manufacturing equipment and design flexibility for adding holes. In other embodiments, an inner longitudinal post and outer longitudinal post may be formed using any other structural forming method. In further embodiments, an inner longitudinal post and outer longitudinal post may be configured with a generally elongated rectangular prism shape. In other embodiments, an inner longitudinal post and/or outer longitudinal post may be configured in any other shape and size such as a generally elongated cylinder shape, a generally elongated triangular prism shape, a generally elongated pentagonal prism shape, a generally elongated hexagonal prism shape, or a generally elongated octagonal prism shape.

In some embodiments, one or more of the automotive lift modules may further comprise a secondary safety mechanical lock system. One example of such a system includes a ratchet attached to one or more of the automotive lift modules which prevents or reduces the likelihood of the automotive lift module retracting upon an actuator failure. The secondary safety mechanical lock system may be designed to comply with the American National Standards Institute-Automotive Lift Institute (ANSI-ALI) regulations as they exist as of 1 Oct. 2019. For that matter, the modular configurable automotive lift disclosed herein may also be designed to comply with the ANSI-ALI regulations as they exist as of 1 Oct. 2019.

The invention claimed is:

1. A modular configurable automotive lift (10) comprising:

at least two automotive lift modules (100) wherein each automotive lift module comprises:

an outer longitudinal post (110) having a hollow interior, an outer longitudinal post first end (111), and an outer longitudinal post second end (112) opposite the outer longitudinal post first end;

an inner longitudinal post (120) at least partially nested within the hollow interior of the outer longitudinal post said inner longitudinal post having an inner longitudinal post first end (121) and an inner longitudinal post second end (122) opposite the inner longitudinal post first end;

a first bearing (115) and a second bearing (125) positioned between an inner surface of the outer longitudinal post and an outer surface of the inner longitudinal post;

an actuator (500) configured to advance the inner longitudinal post first end away from the outer longitudinal post first end; and a superstructure (200) connected to the inner longitudinal post first end by a mounting flange (130), said superstructure comprising at least one vehicle engagement arm (210) extending from the superstructure.

2. The modular configurable automotive lift of claim 1, wherein the actuator is selected from the group consisting of a single hydraulic cylinder, a single pneumatic cylinder, and a single electric actuator.

3. The modular configurable automotive lift of claim 2, wherein the actuator further comprises a position sensor.

4. The modular configurable automotive lift of claim 1, wherein the actuator is a dual redundant hydraulic cylinder (510).

5. The modular configurable automotive lift of claim 1, wherein at least one of the first bearing and the second bearing comprises a material selected from the group consisting of an extruded ultra-high molecular weight polyethylene (UHMWPE) material, bronze, powdered metal, and Teflon®.

6. The modular configurable automotive lift of claim 1, wherein the first bearing comprises more than one first bearing.

7. The modular configurable automotive lift of claim 1, wherein the second bearing comprises more than one second bearing.

8. The modular configurable automotive lift of claim 1, wherein the superstructure comprises at least two vehicle engagement arms extending from the superstructure.

9. The modular configurable automotive lift of claim 1, wherein the vehicle engagement arm is pivotable about an axis which is parallel to a length dimension of the outer longitudinal post and/or the inner longitudinal post, and the vehicle engagement arm is extendable.

10. The modular configurable automotive lift of claim 1, wherein the superstructure comprises a frame engaging pad connected to the superstructure.

11. The modular configurable automotive lift of claim 1, wherein the superstructure comprises a runway connected to the superstructure.

12. The modular configurable automotive lift of claim 1, wherein the outer longitudinal post is sealed at the outer longitudinal post second end.

13. The modular configurable automotive lift of claim 12, wherein at least one of the automotive lift modules does not comprise a secondary environmental isolation structure.

14. The modular configurable automotive lift of claim 1, wherein at least one of the automotive lift modules further comprises a secondary safety mechanical lock system.

* * * * *